United States Patent
Huang et al.

(10) Patent No.: US 12,519,339 B2
(45) Date of Patent: Jan. 6, 2026

(54) UNINTERRUPTIBLE POWER SUPPLY AND POWER SUPPLY SWITCHOVER METHOD

(71) Applicant: Huawei Digital Power Technologies Co., Ltd., Shenzhen (CN)

(72) Inventors: Zhuyong Huang, Dongguan (CN); Chuntao Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/400,056

(22) Filed: Dec. 29, 2023

(65) Prior Publication Data

US 2024/0223004 A1     Jul. 4, 2024

(30) Foreign Application Priority Data

Dec. 30, 2022 (CN) .......................... 202211736667.9

(51) Int. Cl.
*H02J 9/06* (2006.01)

(52) U.S. Cl.
CPC .............. *H02J 9/068* (2020.01); *H02J 9/062* (2013.01)

(58) Field of Classification Search
CPC . H02J 9/068; H02J 9/062; H02J 3/001; Y02B 70/30; Y04S 20/20
See application file for complete search history.

(56) References Cited

U.S. PATENT DOCUMENTS

| | | | |
|---|---|---|---|
| 2023/0006466 A1* | 1/2023 | Zhang | H02J 9/062 |
| 2023/0058139 A1* | 2/2023 | Ratcliff | G01R 31/016 |
| 2023/0179013 A1* | 6/2023 | Zhang | H02M 5/4585 |
| | | | 307/66 |
| 2023/0179014 A1* | 6/2023 | Hao | H02M 5/458 |
| | | | 307/64 |
| 2023/0275453 A1* | 8/2023 | Kano | H02J 3/0073 |
| | | | 307/66 |
| 2024/0120769 A1* | 4/2024 | Kano | H02J 9/06 |
| 2024/0136849 A1* | 4/2024 | Shu | H02J 9/063 |
| 2024/0243605 A1* | 7/2024 | Matsumoto | H02J 9/062 |
| 2024/0339862 A1* | 10/2024 | Momochi | H02J 9/06 |
| 2025/0154410 A1* | 5/2025 | Oie | H01L 21/32134 |
| 2025/0260259 A1* | 8/2025 | Nakamura | H02M 3/003 |

FOREIGN PATENT DOCUMENTS

| | | |
|---|---|---|
| CN | 108808834 A | 11/2018 |
| CN | 212588144 U | 2/2021 |
| KR | 102077528 B1 | 2/2020 |

* cited by examiner

*Primary Examiner* — Daniel Cavallari
(74) *Attorney, Agent, or Firm* — Conley Rose, P.C.

(57) ABSTRACT

An uninterruptible power supply includes a first power input, a second power input, a load end, a bypass, a main circuit, and a controller. The bypass includes a bidirectional switch, and the main circuit includes a rectifier circuit and an inverter circuit. The controller is configured to control a voltage that is output by the inverter circuit to be greater than a voltage that is input to the bypass, so that when currents are input to the bypass and the inverter circuit separately, a current that is output by the inverter circuit is transmitted to the load end. In response to a fault at the load end, the voltage that is output by the inverter circuit suddenly drops below the voltage that is input to the bypass, and a current that is output by the bypass is transmitted to the load end.

20 Claims, 5 Drawing Sheets

UNINTERRUPTIBLE POWER SUPPLY AND POWER SUPPLY SWITCHOVER METHOD

CROSS-REFERENCE TO RELATED APPLICATION

This application claims priority to Chinese Patent Application No. 202211736667.9, filed on Dec. 30, 2022, which is hereby incorporated by reference in its entirety.

TECHNICAL FIELD

This application relates to the field of power electronics, and in particular, to an uninterruptible power supply and a power supply switchover method.

BACKGROUND

An uninterruptible power supply (UPS) includes an energy storage apparatus, and is mainly configured to provide uninterruptible power for devices that require high power stability. When a mains power input is normal, the UPS stabilizes a mains power voltage and supplies the mains power to a load. In this case, the UPS can be considered as an alternating current (AC) voltage regulator and charge a battery. When power-off or a failure occurs on the mains power, the UPS immediately supplies direct current (DC) electric energy stored in the battery to the load by using an inverter, so that the load works normally and is not damaged. In addition, the UPS is provided with a bypass unit with two groups of bidirectional silicon-controlled rectifiers (SCRs). If overload or an output short circuit occurs, the UPS switches from the inverter to the bypass unit to supply power to the load.

Currently, the UPS can switch from the inverter to the bypass unit to supply power to the load after determining that a specific load is faulty. However, it takes specific time for a controller in the UPS to determine that a fault occurs. Therefore, there is specific power-off time in a process of switching from the inverter to the bypass unit to supply power to the load. This reduces power supply reliability of the UPS.

In view of this, a new UPS is required. When a load connected to the UPS is faulty, power supply switchover time from the inverter to the bypass is reduced, and power supply reliability of the UPS is improved.

SUMMARY

This application provides an UPS and a power supply switchover method. When a load connected to the UPS is faulty, power supply switchover time from an energy storage device to the bypass is reduced, and power supply reliability of the UPS is improved.

According to a first aspect, this application provides a UPS. The UPS includes a first power input, a second power input, a load end, a bypass, a main circuit, and a controller. The bypass includes a bidirectional switch, where the bidirectional switch connects the first power input and the load end, and is configured to control connection or disconnection between the first power input and the load end. The main circuit includes a rectifier unit and an inverter unit, where an input of the rectifier unit is connected to the second power input, and an output of the rectifier unit is connected to the inverter unit. The rectifier unit is configured to perform AC to DC conversion on a current that is input by the second power input, and transmit a current obtained through conversion to the inverter unit. An output of the inverter unit is connected to the load end. The inverter unit is configured to perform DC to AC conversion on the input current, and transmit a current obtained through conversion to the load end. The controller is configured to detect a voltage that is input by the first power input to the bypass, and control a voltage that is output by the inverter unit to be greater than the voltage that is input by the first power input to the bypass, so that when currents are input to the bypass and the inverter unit separately, the current that is output by the inverter unit is transmitted to the load end. In response to a fault at the load end, the voltage that is output by the inverter unit suddenly drops below the voltage that is input by the first power input to the bypass, the bidirectional switch is turned on, and the current that is output by the bypass is transmitted to the load end.

The UPS provided in this application is used, so that the voltage that is input by the first power input to the bypass is detected, and the voltage that is output by the inverter unit is controlled to be greater than the voltage that is input by the first power input to the bypass. In this case, when the currents are input to the bypass and the inverter unit separately, and when a load connected to the UPS is normal, the current that is output by the inverter unit is transmitted to the load end. However, when the load end is faulty, the controller does not need to determine, because the voltage that is output by the inverter unit suddenly drops below the voltage that is input by the first power input to the bypass, the bidirectional switch may connect the first power input and the load end. In this case, the bypass supplies power to the load end, the bypass can provide a larger current to the load at the load end, and a circuit breaker or a fuse in a faulty load at the load end is tripped, so that the faulty load is disconnected from the UPS, and another normal load at the load end can still continue to work. In this application, the inverter unit can automatically switch to the bypass based on a change in an electric potential, to output the current to the load. Compared with time consumed by the controller to determine that the load end is faulty, power supply switchover time from the inverter unit to the bypass is reduced. This improves power supply reliability of the UPS.

To control connection or disconnection between the first power input and the load end, as a possible implementation, the bidirectional switch includes a first driving diode and a second driving diode. A negative electrode of the first driving diode is connected to the first power input, and a positive electrode of the second driving diode is connected to the first power input. A positive electrode of the first driving diode is connected to a negative electrode of the second driving diode, and the negative electrode of the second driving diode is connected to the load end. The controller is further configured to, when the voltage that is input by the first power input to the bypass is in a positive half cycle, send a turn-off signal to the first driving diode, and send a turn-on signal to the second driving diode; and when the voltage that is input by the first power input to the bypass is in a negative half cycle, send the turn-on signal to the first driving diode, and send the turn-off signal to the second driving diode.

When the voltage that is input by the first power input to the bypass is in the positive half cycle, both the voltage that is output by the inverter unit and voltage that is output by the bypass are greater than zero, but the voltage that is output by the inverter unit is greater than the voltage that is output by the bypass. In this case, even if the second driving diode receives the turn-on signal, the second driving diode is in a non-conductive state, and the current that is output by the inverter unit is transmitted to the load end. When the voltage that is input by the first power input to the bypass is in the negative half cycle, the voltage that is output by the inverter unit and the voltage that is output by the bypass are lower than zero, but the voltage that is output by the inverter unit is greater than the voltage that is output by the bypass. In this case, even if the first driving diode receives the turn-on signal, the first driving diode is in a non-conductive state, and the current that is output by the inverter unit is transmitted to the load end.

In a possible implementation, when the first driving diode receives the turn-on signal, and a voltage on the positive electrode side of the first driving diode is greater than a voltage on the negative electrode side of the first driving diode, the first driving diode is configured to connect the first power input to the load end. When the second driving diode receives the turn-on signal, and a voltage on the positive electrode side of the second driving diode is greater than a voltage on the negative electrode side of the second driving diode, the second driving diode is configured to connect the load end and the first power input.

Because the controller controls the voltage that is output by the inverter unit to be greater than the voltage that is input by the first power input to the bypass, when the voltage that is input by the first power input to the bypass is excessively high or excessively low, the voltage that is output by the inverter unit may exceed a rated operating voltage range corresponding to the load end. As a possible implementation, the controller is further configured to, when the voltage that is input by the first power input to the bypass does not fall within the rated operating voltage range corresponding to the load end, control the bidirectional switch to disconnect the first power input from the load end, and control the inverter unit to output a voltage within the rated operating voltage range. The controller in this application controls the bidirectional switch to disconnect the first power input from the load end, and control the inverter unit to output the voltage within the rated operating voltage range, to ensure that the load at the load end works normally.

As a possible implementation, the UPS may further include a third power input and a DC to DC (DC-DC) unit. An input of the DC-DC unit is connected to the third power input, and an output of the DC to DC unit is connected to the inverter unit. The DC to DC unit is configured to perform DC to DC conversion on a current that is input by the third power input, and transmit a current obtained through conversion to the inverter unit. When electric energy that is input by the second power input is difficult to meet a power supply requirement of the load end, or the second power input is faulty, the controller may control the DC to DC unit to perform DC to DC conversion on the current that is input by the third power input and transmit a current obtained through conversion to the inverter unit, to meet power supply requirement of the load end.

In a possible implementation, the current that is output by the inverter unit is lower than the current that is output by the bypass. When the load end is faulty, the current that is output by the inverter unit is automatically limited, and a limited input current is difficult to trip the circuit breaker or the fuse in the faulty load. Therefore, the bypass needs to provide a larger current after the bypass supplies power to the load end. In this way, the faulty load is disconnected from the UPS, and the another normal load at the load end can still continue to work.

In a possible implementation, the load end is connected to the load by using a circuit breaker, and the current that is output by the bypass is greater than a rated current of the circuit breaker. In another possible implementation, the load end is connected to the load by using a fuse, and the current that is output by the bypass is greater than a rated current of the fuse. The current that is output by the inverter unit is lower than the current that is output by the bypass, and the bypass provides the larger current and may trip the circuit breaker or the fuse in the faulty load at the load end. Therefore, the circuit breaker or the fuse in the faulty load at the load end is tripped or fused by the large current provided by the bypass, so that the faulty load is disconnected from the UPS, and the another normal load at the load end can continue to work.

According to a second aspect, this application provides a power supply switchover method, applied to the UPS in the first aspect. The method includes detecting a voltage that is input by a first power input to a bypass, and controlling a voltage that is output by an inverter unit to be greater than the voltage that is input by the first power input to the bypass, so that when currents are input to the bypass and the inverter unit separately, a current that is output by the inverter unit is transmitted to the load end. In response to a fault at the load end, the voltage that is output by the inverter unit suddenly drops below the voltage that is input by the first power input to the bypass, the bidirectional switch is turned on, and a current that is output by the bypass is transmitted to the load end.

These aspects or another aspect of this application is clearer and more comprehensible in descriptions of the following embodiments.

DESCRIPTION OF EMBODIMENTS

To make objectives, technical solutions, and advantages of this application clearer, the following further describes this application in detail with reference to the accompanying drawings. However, example implementations may be implemented in a plurality of forms and shall not be construed as being limited to implementations described herein. On the contrary, these implementations are provided such that this application is more comprehensive and complete and fully conveys a concept of the example implementations to a person skilled in the art. Identical reference numerals in the accompanying drawings denote identical or similar structures. Therefore, repeated description thereof is omitted. Terms of positions and directions in this application are described by using the accompanying drawings as an example. However, changes may also be made as required, and all the changes fall within the protection scope of this application. The accompanying drawings in this application are only used to illustrate relative position relationships and do not represent an actual scale.

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that in description of this application, "at least one" means one or more, and "a plurality of" means two or more. In view of this, in embodiments of the present disclosure, "a plurality of" may also be understood as "at least two". The term "and/or" describes an association relationship between associated objects and indicates that three relationships may exist. For example, A and/or B may indicate the following three cases: Only A exists, both A and B exist, and only B exists. In addition, a character "/", unless otherwise specified, usually indicates an "or" relationship between the associated objects. In addition, it should be understood that in the description of this application, the terms such as "first" and "second" are only used for distinguishing and description, but shall not be understood as indicating or implying relative importance, or shall not be understood as indicating or implying a sequence.

It should be noted that, in embodiments of this application, "connection" means an electrical connection. A connection between two electrical elements may be a direct or indirect connection between the two electrical elements. For example, a connection between A and B may represent that A and B are directly connected to each other, or A and B are indirectly connected to each other by using one or more other electrical elements. For example, the connection between A and B may also represent that A is directly connected to C, C is directly connected to B, and A and B are connected to each other through C.

Figure 1:
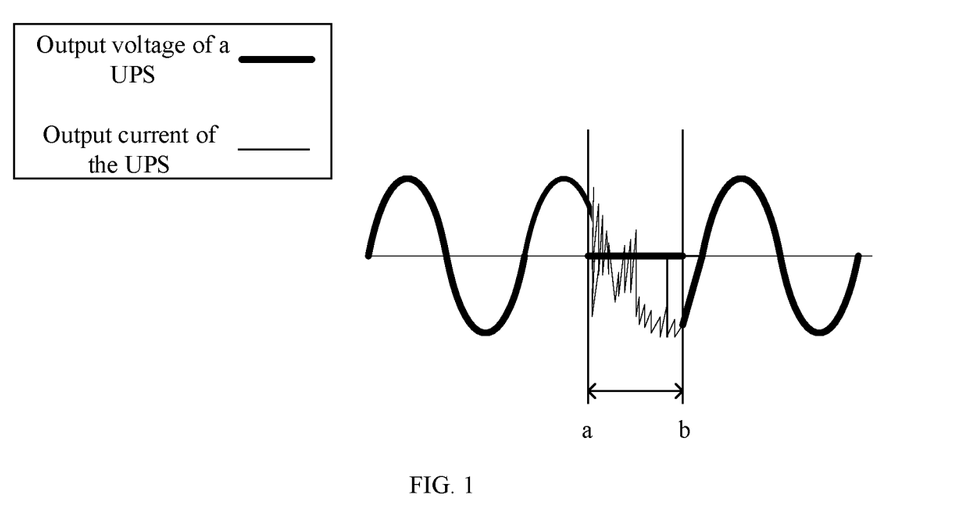
FIG. 1 is a schematic diagram of a voltage and a current that are output by a UPS.

A UPS is configured to supply power to a device that requires high power stability. When a mains power input is normal, the UPS stabilizes a mains power voltage, supplies the mains power to a load, and charges a battery. When power-off or a failure occurs on the mains power, the UPS supplies DC electric energy stored in the battery to the load by using an inverter, so that the load works normally and is not damaged. In addition, the UPS is provided with a bypass to supply power. If overload or an output short circuit occurs, the UPS switches to the bypass to supply power to the load. FIG. 1 is a schematic diagram of a voltage and a current that are output by a UPS. When a specific load that is connected to the UPS is faulty, a current that is output by an inverter in the UPS is automatically limited. In this case, the current that is output by the inverter in the UPS reaches a maximum current limit value, and the voltage is very low and almost 0. If duration is long, because the voltage is low during a fault period, another load that is connected to the UPS is also powered off, causing a more serious problem. In FIG. 1, a voltage in a time period a to b is close to 0. If duration of the time period a to b is extremely long, a load other than the faulty load is also powered off.

In the conventional solution, if a load that is connected to a UPS is faulty, DC electric energy stored in a battery or AC electric energy provided by mains power is first stopped from being supplied to the load by using an inverter. A bypass supplies power to the load after the UPS determines that the load is faulty. When a specific load that is connected to the UPS is faulty, a current that is output by the inverter in the UPS is automatically limited, and a limited input current is still difficult to trip a circuit breaker or a fuse in the faulty load. Therefore, the UPS switches to the bypass to supply power to the load after determining that the specific load connected to the UPS is faulty. Because the bypass unit has a large capacity to provide a larger current, the circuit breaker or the fuse in the faulty load can be tripped, so that the faulty load is disconnected from the UPS, and another normal load can continue to work. However, in the foregoing solution, the bypass can supply power to the load only after the UPS determines that the load is faulty. However, it takes specific time for the UPS to determine that the load is faulty. As shown in FIG. 1, the UPS can determine that the specific load is faulty after comprehensively determining a current and voltage for a specific time period t (in an actual scenario, duration of t is usually 2 millisecond (ms) to 8 ms). If the time period t is set excessively short, the UPS is likely to misdetermine that the load is faulty. If the time period t is set excessively long, the UPS takes a long time to switch from the inverter to the bypass. This means that the UPS is powered off for long time after the specific load is faulty. In addition, it takes time for the circuit breaker or fuse to be tripped. Consequently, the UPS is powered off for a longer time, which affects power supply reliability of the UPS.

In view of this, this application provides a new UPS. When a load connected to the UPS is faulty, power supply switchover time from an inverter to a bypass is reduced, and power supply reliability of the UPS is improved.

Figure 2:
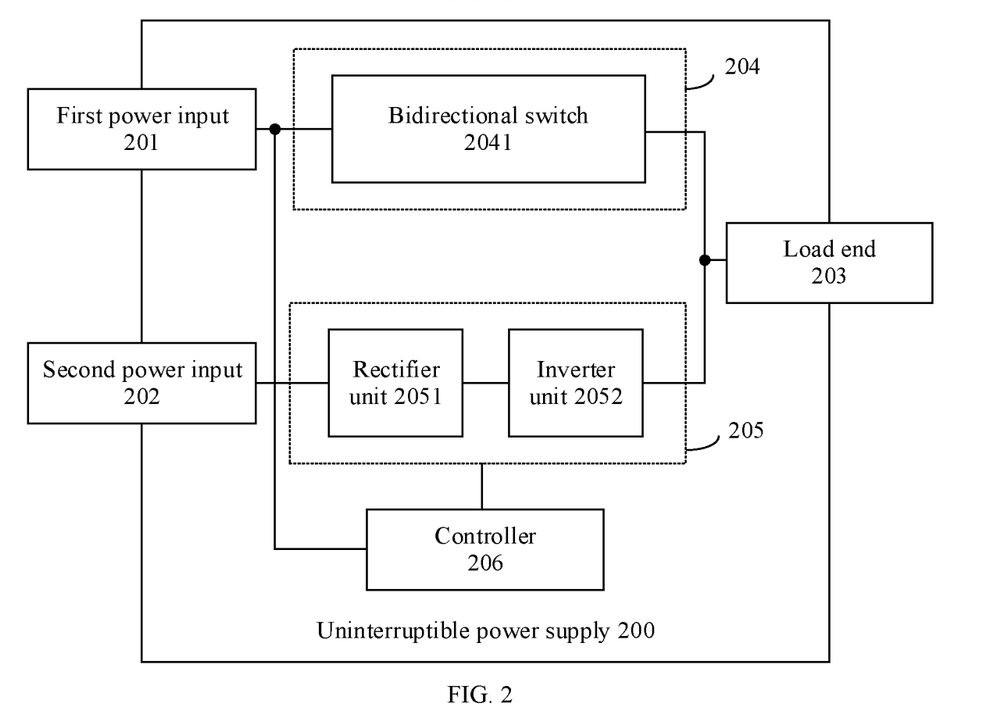
FIG. 2 is a schematic diagram 1 of a structure of a UPS.

FIG. 2 is a schematic diagram 1 of a structure of an UPS. The UPS 200 includes a first power input 201, a second power input 202, a load end 203, a bypass 204, a main circuit 205, and a controller 206.

The bypass includes a bidirectional switch 2041. The bidirectional switch 2041 connects the first power input 201 and the load end 203, and is configured to control connection or disconnection between the first power input 201 and the load end 203.

The main circuit 205 includes a rectifier unit 2051 and an inverter unit 2052. An input of the rectifier unit 2051 is connected to the second power input 202, and an output of the rectifier unit 2051 is connected to the inverter unit 2052. The rectifier unit 2051 is configured to perform AC to DC conversion on a current that is input by the second power input 202, and transmit a current obtained through conversion to the inverter unit 2052. An output of the inverter unit 2052 is connected to the load end 203, and the inverter unit 2052 is configured to perform DC to AC conversion on the input current, and transmit a current obtained through conversion to the load end 203.

The controller 206 is configured to detect a voltage that is input by the first power input 201 to the bypass 204, and control a voltage that is output by the inverter unit 2052 to be greater than the voltage that is input by the first power input 201 to the bypass 204, so that when a current is input to each of the bypass 204 and the inverter unit 2052, the current that is output by the inverter unit 2052 is transmitted to the load end 203.

In response to a fault at the load end 203, the voltage that is output by the inverter unit 2052 suddenly drops below the voltage that is input by the first power input 201 to the bypass 204, the bidirectional switch 2041 is turned on, and the current that is output by the bypass 204 is transmitted to the load end 203.

The first power input 201 may be a bypass input source, and the bypass input source may be single-phase electric power or three-phase electric power. The first power input 201 is configured to supply power to the load end 203 when the second power input 202 cannot supply power. The second power input 202 may include an AC input source, and the AC input source may be an AC input like mains power.

The bypass 204 includes the bidirectional switch 2041. The bidirectional switch 2041 has a capability of enabling bidirectional conduction between the first power input 201 and the load end 203. The bidirectional switch 2041 may include one or more of a plurality of types of driving switch devices such as a silicon controlled rectifier (SCR), a relay, a metal-oxide semiconductor field-effect transistor (MOSFET), a bipolar junction transistor (BJT), an insulated-gate bipolar transistor (IGBT), and a silicon carbide (SiC) power transistor. This is not enumerated in this embodiment of this application.

The rectifier unit 2051 is configured to perform AC to DC conversion on the current that is input by the second power input 202. The rectifier unit 2051 may include an AC to DC (AC-DC) circuit. A specific circuit type and circuit combination manner that may be used for the AC-DC circuit shall be known by a person skilled in the art, and details are not described herein. The inverter unit 2052 may be a DC to AC (DC-AC) circuit, configured to perform DC-AC conversion on the input current, and transmit a current obtained through conversion to the load end 203. When the AC input like the mains power is normal, the controller 206 may control the rectifier unit 2051 to perform AC-DC conversion on the current that is input by the second power input 202, and transmit a current obtained through conversion to the inverter unit 2052. When the load end 203 that is connected to the inverter unit 2052 is faulty, in response to the fault, the voltage that is output by the inverter unit 2052 suddenly drops below the voltage (for example, close to 0) that is input by the first power input 201 to the bypass 204. In addition, the current that is output by the inverter unit 2052 is also automatically limited, and reaches a maximum current limit value.

Figure 3:
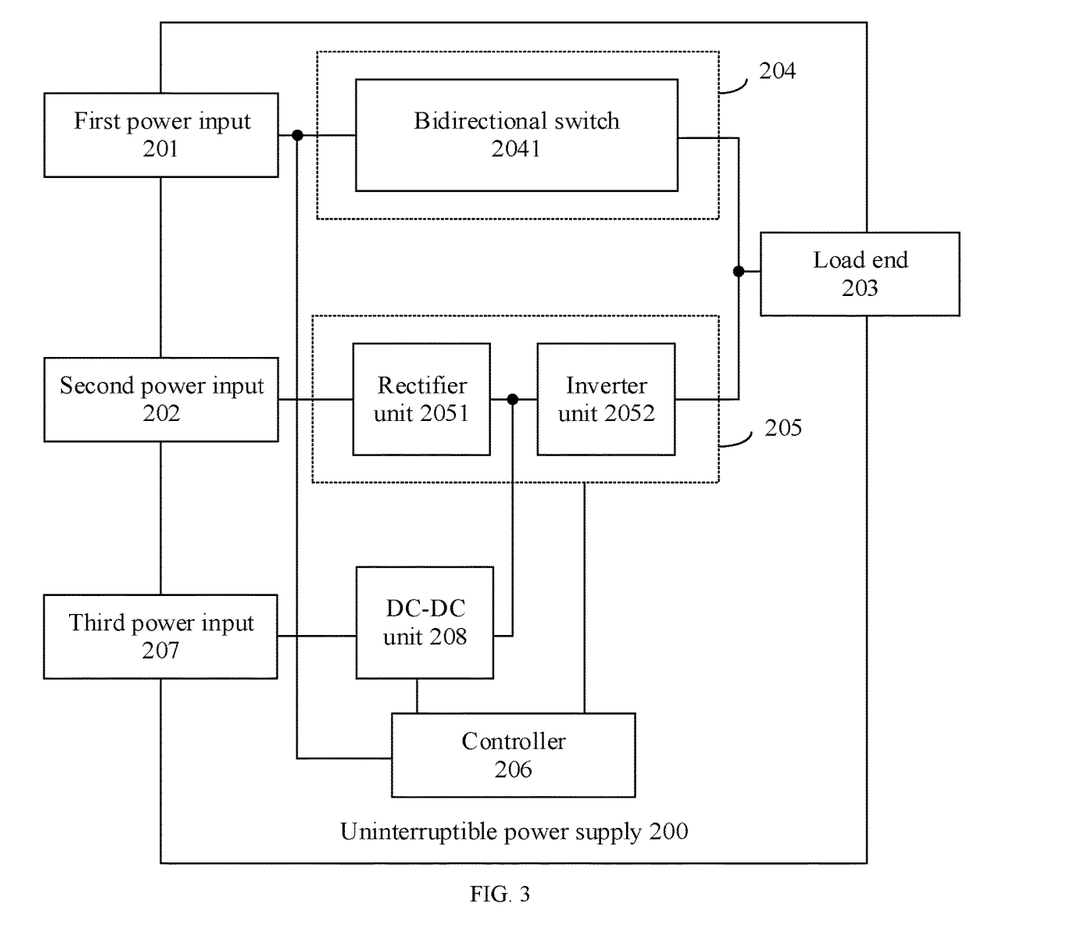
FIG. 3 is a schematic diagram 2 of a structure of a UPS.

Referring to FIG. 3, in a possible implementation, FIG. 3 is a schematic diagram 2 of a structure of a UPS. The UPS 200 may further include a third power input 207 and a DC-DC unit 208. An input of the DC-DC unit 208 is connected to the third power input 207, and an output of the DC-DC unit 208 is connected to the inverter unit 2052. The DC-DC unit 208 is configured to perform DC-DC conversion on a current that is input by the third power input 207, and transmit a current obtained through conversion to the inverter unit 2052.

The DC-DC unit 208 may be a buck circuit, a boost circuit, a buck-boost circuit, or the like. The third power input 207 may be a DC input source. The DC input source may be an energy storage device like a battery cluster. A battery string in the battery cluster may be a single battery, or may be a battery cluster including a plurality of batteries. In an example, the battery may be one or more combinations of a lead-carbon battery, a lithium iron phosphate battery, a ternary lithium battery, a sodium sulfur battery, and a flow battery. The battery string may be flexibly selected based on an actual application environment, a cost budget, and the like.

When electric energy that is input by the second power input 202 is difficult to meet a power supply requirement of the load end 203, or the second power input 202 is faulty, the controller 206 may control the DC-DC unit 208 to perform DC-DC conversion on the current that is input by the third power input 207 and transmit a current obtained through conversion to the inverter unit 2052, to meet power supply of the load end 203.

The controller 206 may be a general-purpose central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The controller 206 may implement or execute various example logical blocks, modules, and circuits described with reference to content disclosed in this application. Alternatively, the foregoing processor may be a combination for implementing a computing function, for example, a combination of one or more microprocessors, a combination of the DSP and the microprocessor. In addition, the controller 206 may further include an analog-to-digital converter (ADC), configured to convert an analog quantity corresponding to the detected voltage that is input by the first power input 201 to the bypass 204 into a digital quantity.

The controller 206 controls the voltage that is output by the inverter unit 2052 to be greater than the voltage that is input by the first power input 201 to the bypass 204, so that when the current is input to each of the bypass 204 and the inverter unit 2052, the current that is output by the inverter unit 2052 is transmitted to the load end 203. The voltage that is output by the inverter unit 2052 may be a fixed value, or may be a dynamic voltage value that changes with the voltage that is input by the first power input 201 to the bypass 204. This application only needs to ensure that an absolute value of the voltage that is output by the inverter unit 2052 is kept greater than an absolute value of the voltage that is input by the first power input 201 to the bypass 204. Another parameter like a frequency of the voltage that is output by the inverter unit 2052 is not limited herein. Any voltage regulation manner that meets a requirement provided in this application may be applied to this application.

Figure 4A:
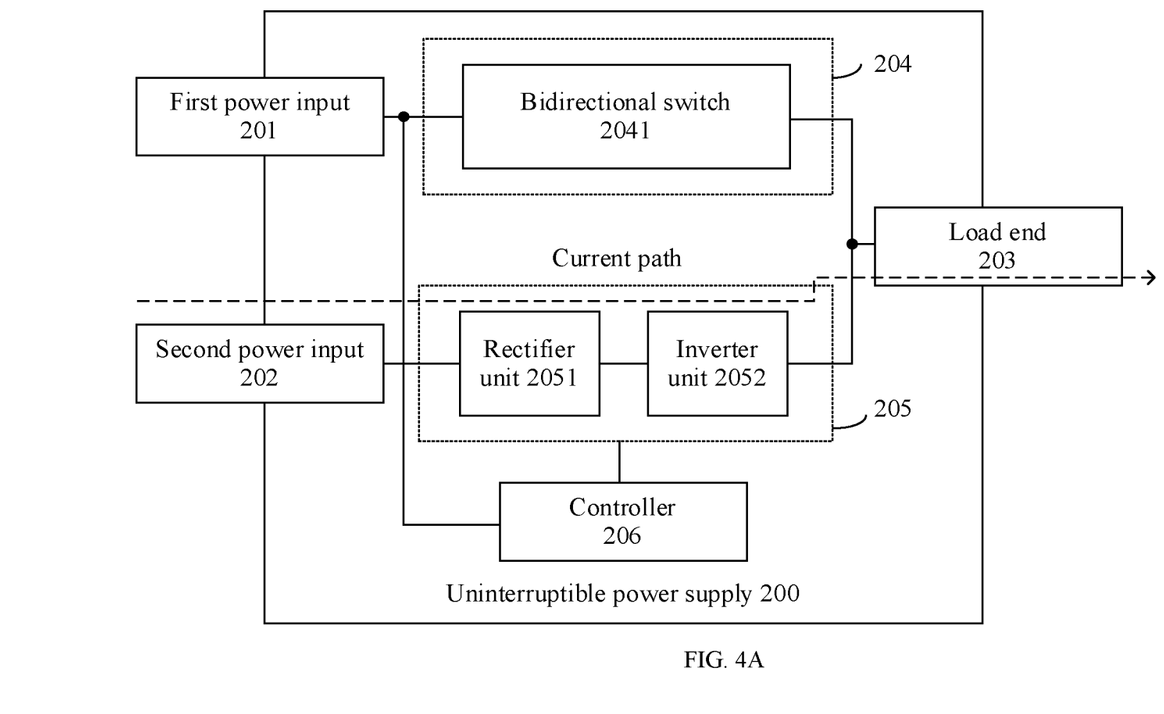
FIG. 4A is a schematic diagram 1 of a voltage output by an inverter unit and a voltage of a bypass.

FIG. 4A is a schematic diagram 1 of a voltage output by an inverter unit and a voltage of a bypass. Because the controller 206 controls the voltage that is output by the inverter unit 2052 to be greater than the voltage that is input by the first power input 201 to the bypass 204, when the current is input to each of the bypass 204 and the inverter unit 2052, an electric potential of the output of the inverter unit 2052 is higher than the voltage that is output by the bypass 204. Therefore, in this case, the current that is output by the inverter unit 2052 is transmitted to the load end 203. In other words, the inverter unit 2052 supplies power to the load end 203.

Figure 4B:
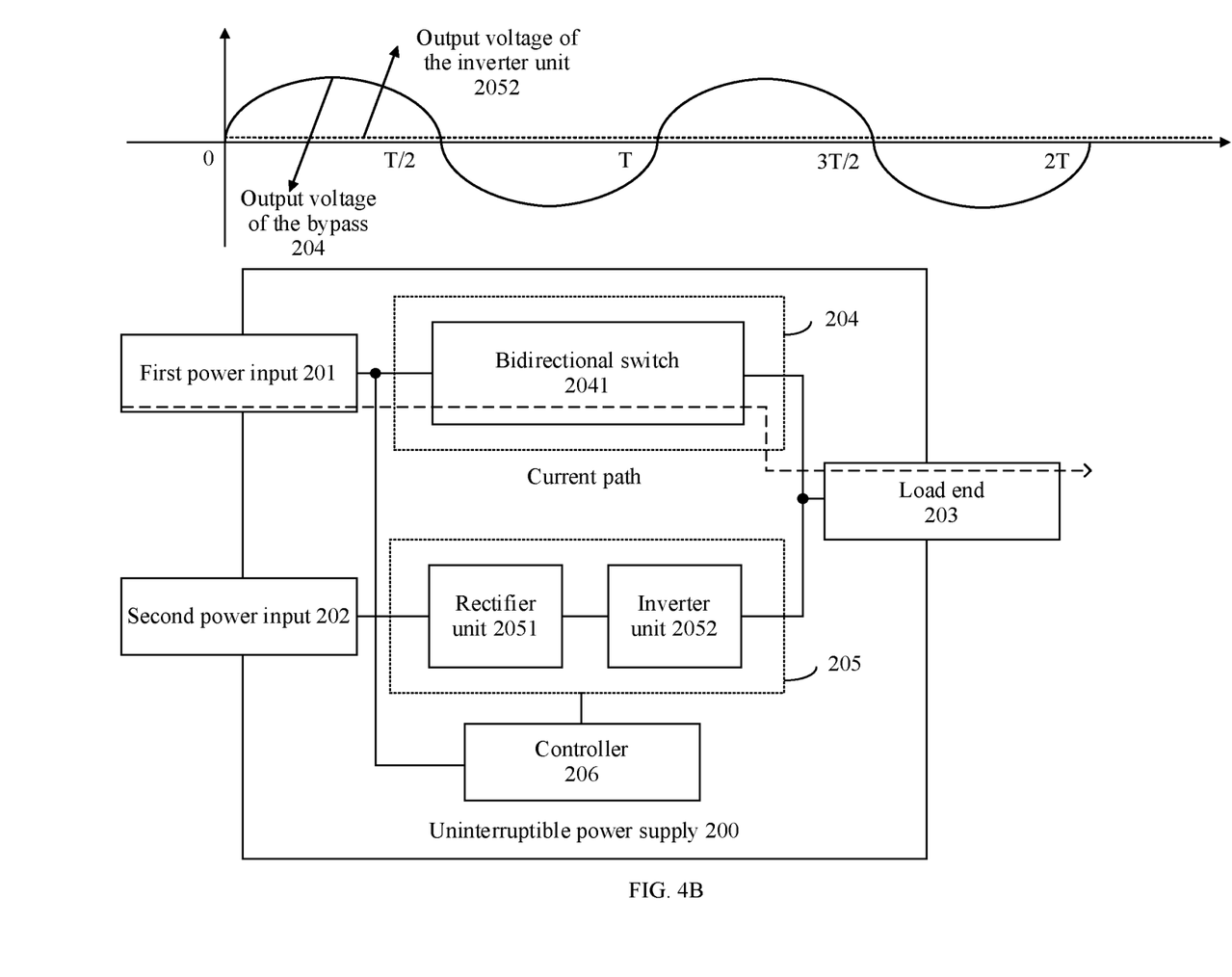
FIG. 4B is a schematic diagram 2 of a voltage output by an inverter unit and a voltage of a bypass.

FIG. 4B is a schematic diagram 2 of a voltage output by an inverter unit and a voltage of a bypass. In response to the fault at the load end 203, the voltage that is output by the inverter unit 2052 automatically and suddenly drops below the voltage (for example, close to 0) that is input by the first power input 201 to the bypass 204. Because the electric potential of the output of the inverter unit 2052 is lower than the voltage that is output by the bypass 204, in this case, the current that is output by the bypass 204 is transmitted to the load end 203. In other words, the bypass 204 supplies power to the load end 203.

When the load end 203 is faulty, the current that is output by the inverter unit 2052 is automatically limited, and the limited input current is difficult to trip the circuit breaker or the fuse in the faulty load. Therefore, the bypass 204 needs to provide a larger current to the load end 203 after the bypass 204 supplies power to the load end 203, and the circuit breaker or the fuse in the faulty load at the load end 203 is tripped. In this way, the faulty load is disconnected from the UPS 200, and another normal load at the load end 203 can continue to work. In addition, in the solution for switching from the inverter unit 2052 to the bypass 204 provided in this application, switchover is not performed after the controller 206 determines that the load end 203 is faulty, but is performed based on a change in an electric potential. Therefore, power supply switchover time from the inverter unit 2052 to the bypass 204 is significantly reduced. This improves power supply reliability of the UPS.

Figure 5:
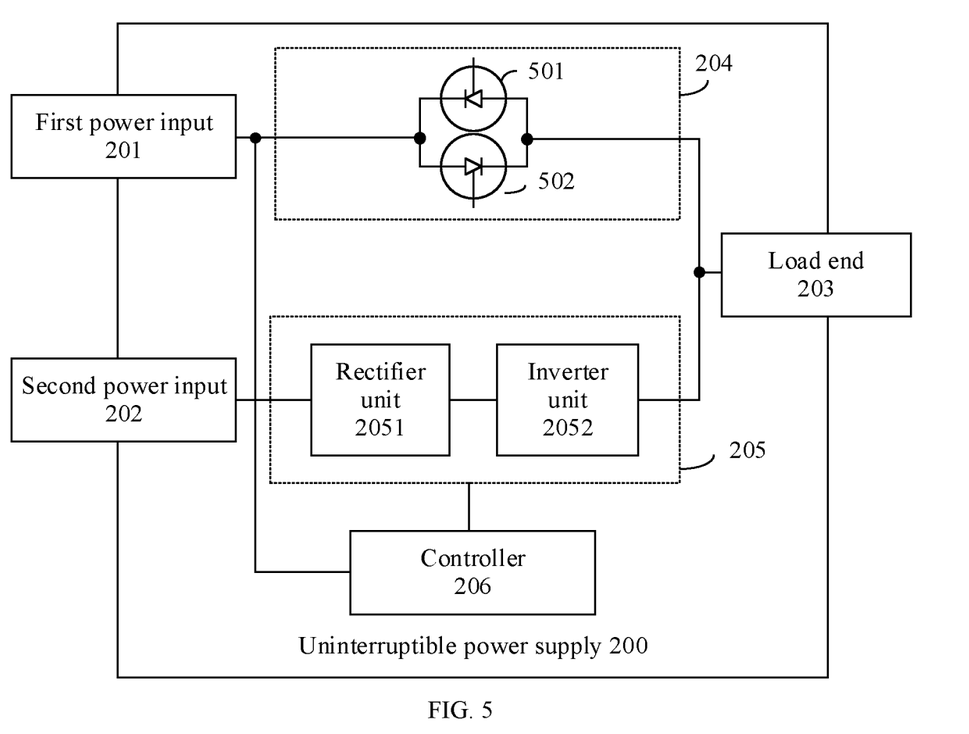
FIG. 5 is a schematic diagram 3 of a structure of a UPS.

As a possible implementation, FIG. 5 is a schematic diagram 3 of a structure of an UPS. To control the connection or disconnection between the first power input 201 and the load end 203, the bidirectional switch 2041 includes a first driving diode 501 and a second driving diode 502. A negative electrode of the first driving diode 501 is connected to the first power input 201, and a positive electrode of the second driving diode 502 is connected to the first power input 201. A positive electrode of the first driving diode 501 is connected to a negative electrode of the second driving diode 502, and the negative electrode of the second driving diode 502 is connected to the load end 203.

The controller 206 is further configured to, when the voltage that is input by the first power input 201 to the bypass 204 is in a positive half cycle, send a turn-off signal to the first driving diode 501, and send a turn-on signal to the second driving diode 502; and when the voltage that is input by the first power input 201 to the bypass 204 is in a negative half cycle, send the turn-on signal to the first driving diode 501, and send the turn-off signal to the second driving diode 502.

When the first driving diode 501 receives the turn-on signal, and a voltage on the positive electrode side of the first driving diode 501 is greater than a voltage on the negative electrode side of the first driving diode 501, the first driving diode 501 is configured to connect the first power input 201 and the load end 203.

When the second driving diode 502 receives the turn-on signal, and a voltage on the positive electrode side of the second driving diode 502 is greater than a voltage on the negative electrode side of the second driving diode 502, the second driving diode 502 is configured to connect the load end 203 and the first power input 201.

In an example, when the voltage that is input by the first power input 201 to the bypass 204 is in the positive half cycle, both the voltage that is output by the inverter unit 2052 and the voltage that is output by the bypass 204 are greater than zero, but the voltage that is output by the inverter unit 2052 is greater than the voltage that is output by the bypass 204. In this case, even if the second driving diode 502 receives the turn-on signal, the second driving diode 502 is in a non-conductive state, and the current that is output by the inverter unit 2052 is transmitted to the load end 203.

When the voltage that is input by the first power input 201 to the bypass 204 is in the negative half cycle, the voltage that is output by the inverter unit 2052 and the voltage that is output by the bypass 204 are lower than zero, but the voltage that is output by the inverter unit 2052 is greater than the voltage that is output by the bypass 204. In this case, even if the first driving diode 501 receives the turn-on signal, the first driving diode 501 is in a non-conductive state, and the current that is output by the inverter unit 2052 is transmitted to the load end 203.

However, when the load end 203 is faulty, and the voltage that is input to the bypass 204 by the first power input 201 is in the positive half cycle, the voltage that is output by the inverter unit 2052 suddenly drops below the voltage that is input by the first power input 201 to the bypass 204. In this case, the positive voltage of the second driving diode 502 is greater than the negative voltage, the second driving diode 502 receives the turn-on signal, and a second driving signal is in a conduction state, so that the current that is output by the bypass 204 is transmitted to the load end 203.

However, when the load end 203 is faulty, and the voltage that is input to the bypass 204 by the first power input 201 is in the negative half cycle, the voltage that is output by the inverter unit 2052 suddenly drops below the voltage that is input by the first power input 201 to the bypass 204. In this case, the positive voltage of the first driving diode 501 is greater than the negative voltage, the first driving diode 501 receives the turn-on signal, and a first driving signal is in a conduction state, so that the current that is output by the bypass 204 is transmitted to the load end 203.

In addition, when the first power input 201 is the three-phase electric power, the bidirectional switch 2041 described in the foregoing embodiment includes three groups of bidirectional switches 2041. The three groups of bidirectional switches 2041 are separately driven based on the positive half cycle and the negative half cycle of the voltage of the first power input 201. The person skilled in the art should know a specific implementation, and details are not described herein again.

Because the controller 206 controls the voltage that is output by the inverter unit 2052 to be greater than the voltage that is input by the first power input 201 to the bypass 204, when the voltage that is input by the first power input 201 to the bypass 204 is excessively high or excessively low, the voltage that is output by the inverter unit 2052 may exceed a rated operating voltage range corresponding to the load end 203. For example, when an effective value of the voltage that is input by the first power input 201 to the bypass 204 is 240 V, an effective value of the voltage that is output by the inverter unit 2052 needs to be greater than 240 V, and 240 V exceeds the rated operating voltage range corresponding to the load end 203.

Therefore, when the voltage that is input by the first power input 201 to the bypass 204 does not fall within the rated operating voltage range corresponding to the load end 203, the controller 206 in this application controls the bidirectional switch 2041 to disconnect the first power input 201 from the load end 203, and controls the inverter unit 2052 to output a voltage within the rated operating voltage range, to ensure that a load at the load end 203 works normally.

In a possible implementation, the load end 203 is connected to the load by using a circuit breaker, and the current that is output by the bypass 204 is greater than a rated current of the circuit breaker. In another possible implementation, the load end 203 is connected to the load by using a fuse, and the current that is output by the bypass 204 is greater than a rated current of the fuse.

The current that is output by the inverter unit 2052 is lower than the current that is output by the bypass 204, and the bypass 204 provides the larger current and may trip the circuit breaker or the fuse in the faulty load at the load end 203. Therefore, the circuit breaker or the fuse in the faulty load at the load end 203 is tripped or fused by the large current provided by the bypass 204, so that the faulty load is disconnected from the UPS, and the another normal load at the load end 203 can continue to work.

The UPS provided in this application is used, so that the voltage that is input by the first power input to the bypass is detected, and the voltage that is output by the inverter unit is controlled to be greater than the voltage that is input by the first power input to the bypass. In this case, when the currents are input to the bypass and the inverter unit separately, and when the load connected to the UPS is normal, the current that is output by the inverter unit is transmitted to the load end. However, when the load end is faulty, the controller does not need to determine, the voltage that is output by the inverter unit suddenly drops below the voltage that is input by the first power input to the bypass, and the bidirectional switch connects the first power input and the load end. Therefore, the bypass supplies power to the load end, the bypass can provide the larger current to the load at the load end, and the circuit breaker or the fuse in the faulty load at the load end is tripped. In this way, the faulty load is disconnected from the UPS, and the another normal load at the load end can still continue to work. In this application, the inverter unit can switch to the bypass based on a change in an electric potential. Compared with time for the controller to determine that the load end is faulty, power supply switchover time from the inverter unit to the bypass is reduced. This improves power supply reliability of the UPS.

Based on a same concept, this application further provides a power supply switchover method, applied to the UPS in the foregoing embodiments. The method includes detecting a voltage that is input by a first power input to a bypass, and controlling a voltage that is output by an inverter unit to be greater than the voltage that is input by the first power input to the bypass, so that when currents are input to the bypass and the inverter unit separately, a current that is output by the inverter unit is transmitted to a load end. In response to a fault at the load end, the voltage that is output by the inverter unit suddenly drops below the voltage that is input by the first power input to the bypass, a bidirectional switch is turned on, and a current that is output by the bypass is transmitted to the load end.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may be implemented in a form of a computer program product that is implemented on one or more computer-usable storage media (including but not limited to a disk memory, a compact disc read-only memory (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine. In this way, the instructions, when executed by the processor of the computer or the another programmable data processing device, generate an apparatus for implementing functions specified in one or more processes in the flowcharts and/or in one or more blocks in the block diagrams.

Alternatively, these computer program instructions may be stored in a computer-readable memory that can indicate a computer or another programmable data processing device to work in a specific manner. In this way, the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that the person skilled in the art can make various modifications and variations to this application without departing from the spirit and scope of this application. This application is intended to cover these modifications and variations provided that these modifications and variations in this application fall within the scope of the claims and their equivalent technologies of this application.

What is claimed is:

1. An uninterruptible power supply (UPS), comprising:
    a first power input configured to:
        output a first power input voltage; and
        output a first power input current;
    a second power input configured to output a second power input current;
    a load end;
    a bypass circuit comprising a bidirectional switch and configured to:
        receive the first power input voltage;
        output a bypass current; and
        control, using the bidirectional switch, connection or disconnection between the first power input and the load end;
    a main circuit, comprising:
        a rectifier circuit comprising a rectifier circuit input connected to the second power input, and comprising a rectifier circuit output, wherein the rectifier circuit is configured to:
            perform alternating current (AC)-to-direct current (DC) conversion on the second power input current to obtain a converted current; and
            transmit the converted current; and
        an inverter circuit comprising an inverter circuit input connected to the rectifier circuit output and an inverter circuit output connected to the load end, wherein the inverter circuit is configured to:
            receive the converted current;
            perform DC-to-AC conversion on the converted current to obtain an inverted current;
            transmit the inverted current to the load end; and
            output an inverter circuit voltage; and
    a controller configured to:
        detect the first power input voltage to the bypass circuit;
        control the inverter circuit voltage to be greater than the first power input voltage; and
        transmit the inverted current to the load end when the first power input current is input to the bypass circuit and the converted current is input to the inverter circuit,
        wherein in response to a fault at the load end:
            the inverter circuit voltage drops below the first power input voltage;
            the bidirectional switch is turned on; and
            the bypass circuit current is transmitted to the load end.

2. The UPS of claim 1, wherein the bidirectional switch comprises:
    a first driving diode comprising:
        a first driving diode negative electrode connected to the first power input; and
        a first driving diode positive electrode; and a second driving diode comprising:
- a second driving diode negative electrode connected to the first driving diode positive electrode and to the load end; and
- a second driving diode positive electrode connected to the first power input, and wherein the controller is further configured to:
- send a turn-off signal to the first driving diode and send a turn-on signal to the second driving diode when the first power input voltage is in a positive half cycle; and
- send a turn-on signal to the first driving diode and send a turn-off signal to the second driving diode when the first power input voltage is in a negative half cycle.

3. The UPS of claim 2, wherein the first driving diode is configured to connect the first power input and the load end when the first driving diode receives a turn-on signal and a first driving diode positive electrode voltage is greater than a first driving diode negative electrode voltage, and wherein the second driving diode is configured to connect the load end and the first power input when the second driving diode receives a turn-on signal and a second driving diode positive electrode voltage is greater than a second driving diode negative electrode voltage.

4. The UPS of claim 1, wherein, when the first power input voltage is not within a rated operating voltage range corresponding to the load end, the controller is further configured to:
- control the bidirectional switch to disconnect the first power input from the load end; and
- control the inverter circuit to output an inverter circuit second voltage within the rated operating voltage range.

5. The UPS of claim 2, wherein, when the first power input voltage is not within a rated operating voltage range corresponding to the load end, the controller is further configured to:
- control the bidirectional switch to disconnect the first power input from the load end; and
- control the inverter circuit to output an inverter unit second voltage within the rated operating voltage range.

6. The UPS of claim 3, wherein, when the first power input voltage is not within a rated operating voltage range corresponding to the load end, the controller is further configured to:
- control the bidirectional switch to disconnect the first power input from the load end; and
- control the inverter unit to output an inverter unit second voltage within the rated operating voltage range.

7. The UPS of claim 1, wherein the inverted current is lower than the bypass current.

8. The UPS of claim 1, wherein the load end is configured to connect to a load using a circuit breaker, and wherein the bypass current is greater than a rated current of the circuit breaker.

9. The UPS of claim 1, further comprising:
a third power input configured to:
- output a third power input current; and
- output a third power input voltage; and
a DC-to-DC circuit comprising:
- a DC-to-DC input configured to receive the third power input voltage; and
- a DC-to-DC output connected to the rectifier circuit output.

10. The UPS of claim 9, wherein the second power input is further configured to output a second power input voltage, and wherein when the second power input voltage is not within a rated operating voltage range corresponding to the load end, the controller is further configured to:
- control the DC-to-DC circuit to perform DC-to-DC conversion on the third power input current to obtain a DC-to-DC converted current; and
- transmit the DC-to-DC converted current to the inverter circuit.

11. The UPS of claim 9, wherein third power circuit is a DC input source.

12. A method for an uninterruptible power supply (UPS), comprising;
- outputting, by a first power input, a first power input voltage and a first power input current;
- outputting, by a second power input, a second power input current;
- receiving, by a bypass circuit, the first power input voltage;
- outputting, by the bypass circuit, a bypass current in response to receiving the first power input voltage;
- controlling, by a bidirectional switch of the bypass circuit, connection or disconnection between the first power input and a load end;
- performing, by a rectifier circuit, alternating current (AC) to direct current (DC) conversion on the second power input current to obtain a converted current;
- transmitting, by the rectifier circuit, the converted current in response to obtaining the converted current;
- receiving, with an inverter circuit, the converted current;
- performing, with the inverter circuit, DC to AC conversion on the converted current to obtain an inverted current;
- transmitting, by the inverter circuit, the inverted current to the load end;
- outputting, by the inverter circuit, an inverter circuit voltage;
- detecting, with a controller, the first power input voltage to the bypass circuit;
- controlling, with the controller, the inverter circuit voltage to be greater than the first power input voltage to the bypass circuit; and
- transmitting, with the controller, the inverted current to the load end when the first power input current is input to the bypass circuit and the converted current is input to the inverter circuit.

13. The method of claim 12, further comprising:
- transmitting, by the controller, a turn-off signal to a first driving diode of the bidirectional switch and a turn-on signal to a second driving diode of the bidirectional switch when the first power input voltage is in a positive half cycle; and
- transmitting, by the controller, a turn-on signal to the first driving diode and a turn-off signal to the second driving diode when the first power input voltage is in a negative half cycle.

14. The method of claim 13, further comprising:
- connecting, by the first driving diode, the first power input and the load end when the first driving diode receives a turn-on signal and a first driving diode positive electrode voltage is greater than a first driving diode negative electrode voltage; and
- connecting, by the second driving diode, the load end and the first power input when the second driving diode receives a turn-on signal and a second driving diode positive electrode voltage is greater than a second driving diode negative electrode voltage.

15. The method of claim 12, wherein when the first power input voltage is not within a rated operating voltage range corresponding to the load end, the method further comprises:
    controlling, by the controller, the bidirectional switch to disconnect the first power input from the load end; and
    controlling, by the controller the inverter circuit to output an inverter circuit second voltage within the rated operating voltage range.

16. The method of claim 13, wherein when the first power input voltage is not within a rated operating voltage range corresponding to the load end, the method further comprises:
    controlling, by the controller, the bidirectional switch to disconnect the first power input from the load end; and
    controlling, by the controller, the inverter circuit to output an inverter circuit second voltage within the rated operating voltage range.

17. The method of claim 14, wherein when the first power input voltage is not within a rated operating voltage range corresponding to the load end, the method further comprises:
    controlling, by the controller, the bidirectional switch to disconnect the first power input from the load end; and
    controlling, by the controller, the inverter circuit to output an inverter circuit second voltage within the rated operating voltage range.

18. The method of claim 12, wherein the inverted current is lower than the bypass current.

19. The method of claim 12, further comprising:
    outputting, by a third power input, a third power input current and a third power input voltage; and
    receiving, by a DC to DC input, the third power input voltage; and
    outputting, by the DC to DC input, a DC to DC output voltage to the inverter circuit in response to receiving the third power input voltage.

20. The method of claim 19, wherein when a second power input voltage of the second power input is not within a rated operating voltage range corresponding to the load end, the method further comprises:
    to:
        controlling the DC to DC circuit to perform DC to DC conversion on the third power input current;
        obtaining, by the DC to DC circuit, a DC to DC converted current in response to controlling the DC to DC circuit; and
        transmitting, by the DC to DC circuit, the DC to DC converted current to the inverter circuit.

\* \* \* \* \*